(12) United States Patent
Labrecque et al.

(10) Patent No.: US 11,828,248 B1
(45) Date of Patent: Nov. 28, 2023

(54) ROTATABLY DRIVEN EXHAUST MIXER

(71) Applicant: PRATT & WHITNEY CANADA CORP., Longueuil (CA)

(72) Inventors: Michel Labrecque, Sainte-Julie (CA); Kevin Nguyen, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/809,033

(22) Filed: Jun. 27, 2022

(51) Int. Cl.
*F02K 1/38* (2006.01)
*F02K 1/48* (2006.01)
*B01F 23/10* (2022.01)

(52) U.S. Cl.
CPC .............. *F02K 1/386* (2013.01); *B01F 23/14* (2022.01); *F02K 1/48* (2013.01)

(58) Field of Classification Search
CPC ................ F02K 1/46; F02K 1/48; F02K 1/386
See application file for complete search history.

(56) References Cited

U.S. PATENT DOCUMENTS

| | | | | |
|---|---|---|---|---|
| 2,997,845 A * | 8/1961 | Oulianoff | .................. | F02K 1/48 239/265.17 |
| 3,060,681 A * | 10/1962 | Morley | ..................... | F02K 1/15 181/215 |
| 4,754,924 A | 7/1988 | Shannon | | |
| 5,791,138 A * | 8/1998 | Lillibridge | .............. | F02K 1/386 60/262 |
| 6,662,548 B1 | 12/2003 | Clark | | |
| 8,881,502 B2 * | 11/2014 | Jodet | ......................... | F02K 1/48 60/39.5 |
| 2011/0030380 A1 * | 2/2011 | Widdle, Jr. | ............. | F02K 1/386 239/265.33 |
| 2011/0167785 A1 * | 7/2011 | Moore | ..................... | F02K 3/077 60/226.1 |
| 2012/0096831 A1 * | 4/2012 | Do | .......................... | F02K 1/386 60/226.1 |
| 2016/0010590 A1 * | 1/2016 | Rolt | ......................... | F02K 1/15 60/805 |

* cited by examiner

*Primary Examiner* — Ehud Gartenberg
*Assistant Examiner* — Henry Ng
(74) *Attorney, Agent, or Firm* — NORTON ROSE FULBRIGHT CANADA LLP (57) ABSTRACT

There is provided an exhaust mixer arrangement for a turbofan engine having a bypass passage for channelling a bypass flow and a core passage for channelling a core flow around a central axis. The exhaust mixer arrangement comprises a mixer body mounted for rotation about the central axis. The mixer body has an annular wall extending around the central axis. The annular wall defines a plurality of circumferentially distributed alternating inner and outer lobes, with each inner lobe protruding into the core passage, and each outer lobe protruding into the annular bypass passage. A driving unit is operatively connected to the mixer body for selectively driving the mixer body in rotation about the central axis. A controller is operatively connected to the driving unit for controlling a rotational speed of the mixer body as a function of a flight operating condition.

18 Claims, 5 Drawing Sheets

ROTATABLY DRIVEN EXHAUST MIXER

TECHNICAL FIELD

The application relates generally to turbofan engines and, more particularly, to a turbine exhaust mixer for such engines.

BACKGROUND OF THE ART

In turbofan engines, high velocity gases from the turbofan core is mixed with low velocity air from the bypass duct, and this fluid mixture is then exhausted from the engine. Turbofan engines generally use exhaust mixers in order to increase the mixing of the high and low velocity fluid flows. The exhaust mixers have lobes that enhance the mixing of the flows and augment thrust. Typically, aggressive lobe designs are used to promote better mixing. However, aggressive lobes designs come with trade-offs. Alternatives are thus desirable.

SUMMARY

In one aspect, there is provided an exhaust mixer arrangement for a turbofan engine having an annular bypass passage for channelling a bypass flow, and a core passage for channelling a core flow around a central axis, the exhaust mixer arrangement comprising: a mixer body mounted for 360-degree rotation about the central axis, the mixer body having an annular wall extending around the central axis, the annular wall defining a plurality of circumferentially distributed alternating inner and outer lobes, with each inner lobe protruding into the core passage, and each outer lobe protruding into the annular bypass passage; a driving unit operatively connected to the mixer body for selectively driving the mixer body in rotation about the central axis; and a controller operatively connected to the driving unit, the controller operational to control a rotational speed of the mixer body as a function of a flight operating condition.

In another aspect, there is provided a turbofan engine comprising: a fan; an annular bypass passage for channelling air received from the fan; a compressor downstream of the fan; a turbine fluidly connected to the compressor via a core passage; an exhaust mixer fluidly connected to the annular bypass passage and the core flow passage downstream of the turbine, the exhaust mixer having a mixer body rotatable around a central axis, the mixer body having an annular wall extending around the central axis, the annular wall defining a plurality of circumferentially distributed alternating inner and outer lobes, with each inner lobe protruding into the core passage, and each outer lobe protruding into the annular bypass passage; a driving unit operatively connected to the mixer body for selectively driving the mixer body at a selected rotational speed around the central axis; and a controller operatively connected to the driving unit, the controller configured to control a rotational speed of the mixer body as a function of a flight operating condition.

In a further aspect, there is provided a method of mixing a core flow and a bypass flow surrounding the core flow with an exhaust mixer having circumferentially alternating inner and outer lobes respectively extending into the core flow and the bypass flow, the method comprising: circulating the core flow through the exhaust mixer and the bypass flow around the exhaust mixer; and during a descent/approach segment of a flight, driving the exhaust mixer in rotation at a selected rotational speed in a swirl direction of the core flow.

DESCRIPTION OF THE DRAWINGS

Reference is now made to the accompanying figures in which.

DETAILED DESCRIPTION

Figure 1:
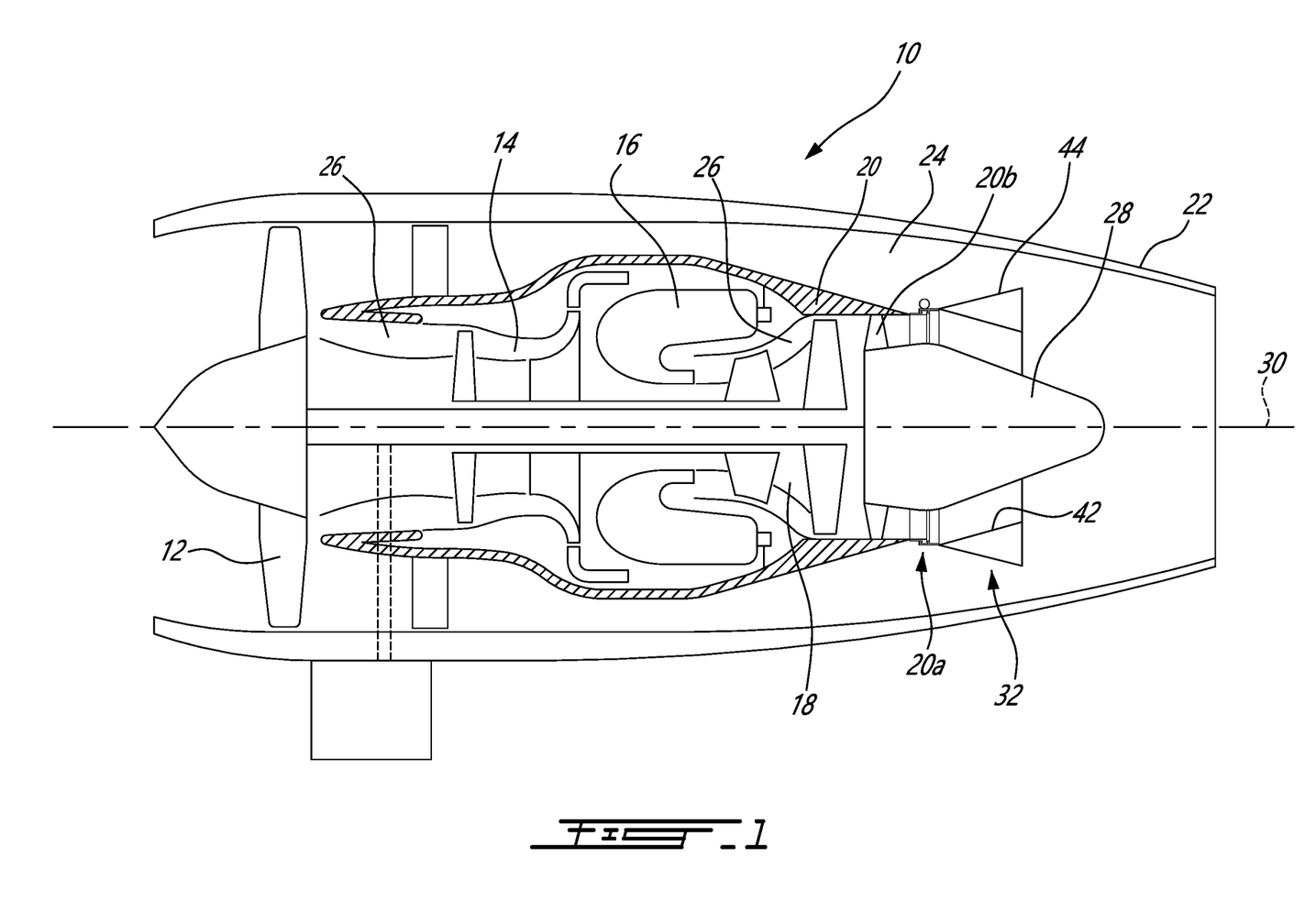
FIG. 1 is a schematic cross section view of a long cowl turbofan engine having a rotatably driven exhaust mixer.

FIG. 1 illustrates a turbofan engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

The turbofan engine 10 includes a first casing 20 which encloses the turbo machinery of the engine, and a second, outer casing 22 extending outwardly of the first casing 20 such as to define an annular bypass passage 24 therebetween. The air propelled by the fan 12 is split into a first portion which flows around the first casing 20 within the bypass passage 24, and a second portion which flows through a main gas path or annular core passage 26, which is defined within the first casing 20 and allows the flow to circulate through the multistage compressor 14, combustor 16 and turbine section 18 as described above.

Figure 3:
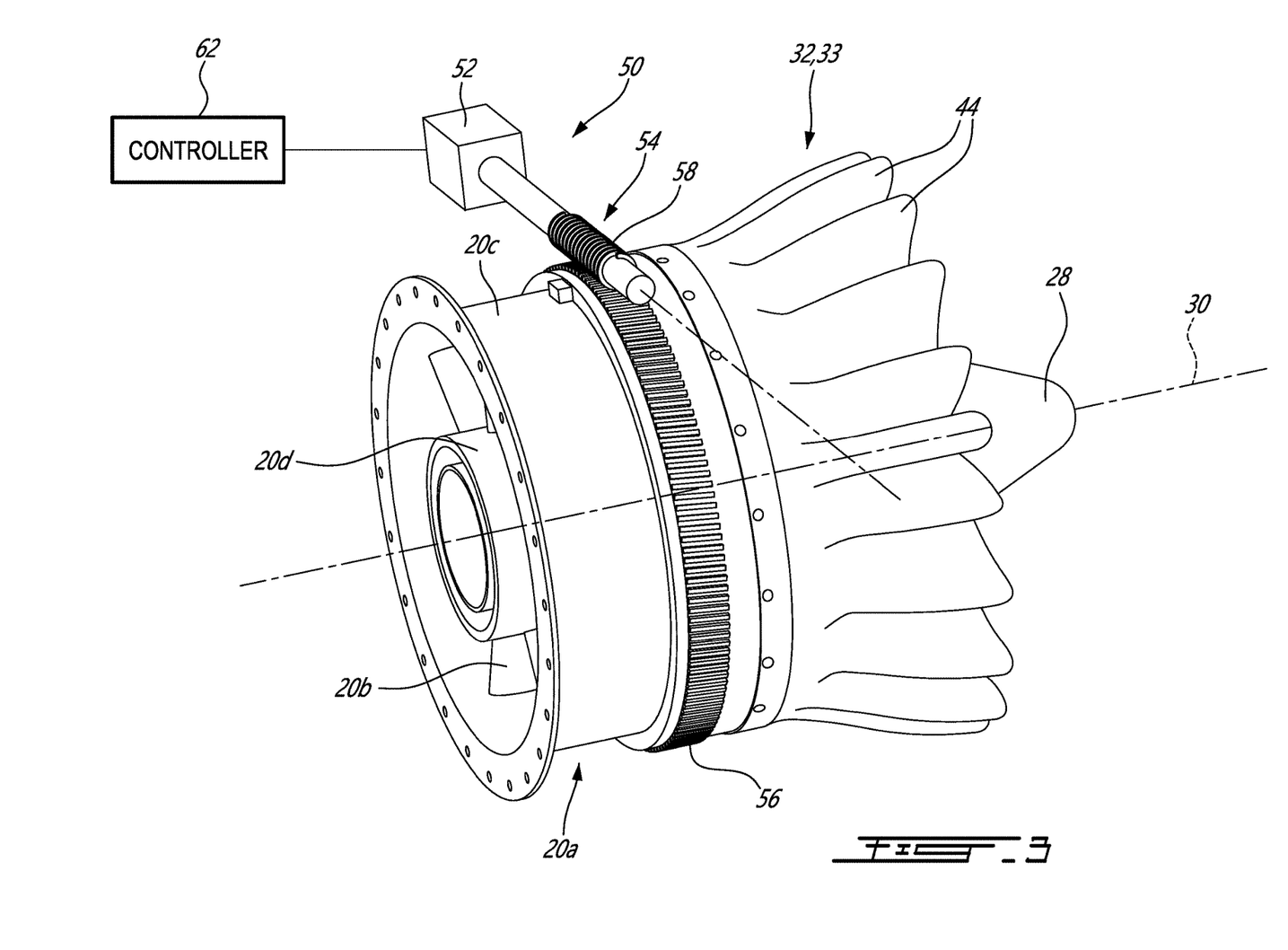
FIG. 3 is an isometric view of a rotatably driven mixer arrangement comprising a controller operatively connected to a driving unit drivingly connected to a rotatable exhaust mixer body rotatably mounted to a turbine exhaust case (TEC)

The first casing 20 may be composed of a number of axially serially interconnected cases, including a turbine exhaust case (TEC) 20a (FIG. 3) extending downstream from the last stage of turbine blades of the turbine section 18. As shown in FIG. 3, the TEC 20a may comprise an array of circumferentially spaced-apart struts 20b extending between a radially outer annular wall 20c and a radially inner annular wall 20d, the radially outer and an inner annular walls 20c, 20d concentrically disposed around a central axis 30 (e.g. the engine centerline). The radially outer and inner annular walls 20c, 20d respectively form part of the outer and inner flow boundary walls of the core passage 26. As exemplified in FIG. 1, an axisymmetrical bullet or tail cone 28 may be centrally mounted to the rear end of the TEC 20a so as to project axially rearwardly therefrom. The tail cone 28 defines a rearmost extension of the inner flow boundary wall of the core passage 26.

Figure 2:
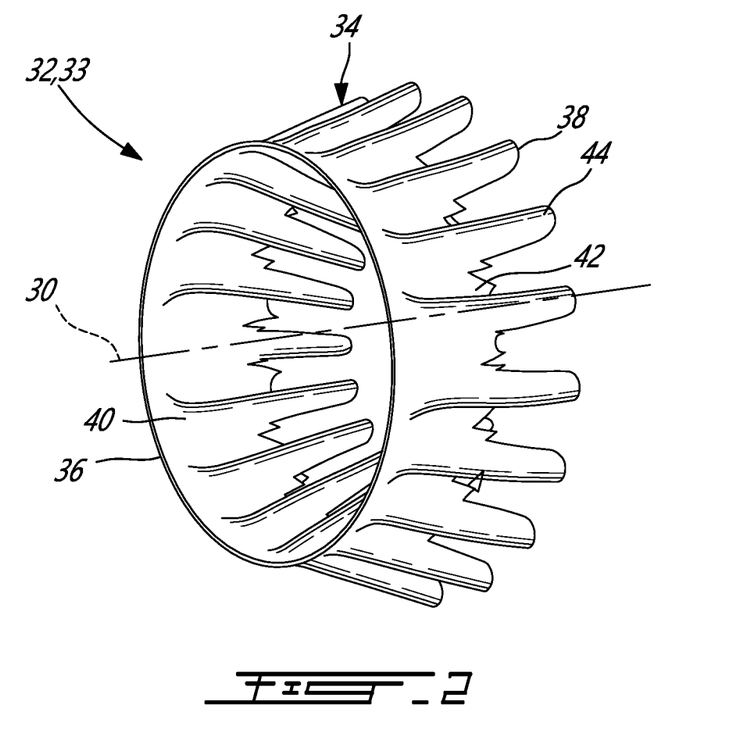
FIG. 2 is an isometric view of an exemplary mixer body of the rotatably driven exhaust mixer.

Referring to FIGS. 1 to 3, it can be seen that the engine 10 further comprises an exhaust mixer arrangement. The exhaust mixer arrangement generally comprises an exhaust mixer 32 for mixing the core flow and the bypass flow at the discharge end of the engine 10. According to some embodiments, the exhaust mixer 32 is mounted to the TEC 20a inside the outer casing 22 so as to surround at least a portion of the tail cone 28. The mixer 32 acts as a rearmost portion of the outer wall defining the core passage 26 and a rearmost portion of the inner wall defining the bypass passage 24. The hot gases from the main gas path 26 and the cooler air from the bypass passage 24 are, thus, mixed together by the exhaust mixer 32 at the exit thereof such as to produce an exhaust with a reduced temperature.

Referring to FIG. 2, the exhaust mixer 32 includes a mixer body 33 having annular wall 34 extending centrally around the central axis 30. The mixer body 33 has an upstream end 36 along which the flows from the core passage 26 and from the bypass passage 24 are received, and a downstream end 38 where the two flows meet and are mixed together. The annular wall 34 of the mixer body 33 may have a frustoconical portion 40 extending from and defining the upstream end 36, the frustoconical portion 40 having a diameter progressively reducing toward the downstream end 38. The annular wall 34 also defines a plurality of circumferentially distributed lobes extending in a rearward or downstream direction from the frustoconical portion 40. The lobes include alternating inner and outer lobes 42, 44, with the outer lobes 44 extending radially outwardly into the bypass passage 24 and the inner lobes 42 extending radially inwardly into the core passage 26. As such, the inner lobes 42 define troughs in the bypass passage 24 in between adjacent ones of the outer lobes 44, while the outer lobes 44 define troughs in the core passage 26 in between adjacent ones of the inner lobes 42. In the embodiment shown, each lobe 42, 44 has a radially elongated cross-section including a rounded tip, and extends from the frustoconical portion 40 to the downstream end 38 of the mixer body.

In certain embodiments, the shape and configuration of the mixer body 33, including the shape and configuration of the inner and outer lobes 42, 44, can be similar to those of the mixers described in U.S. Pat. Nos. 11,085,333 and 8,104,260 respectively issued on Aug. 10, 2021, and Jan. 31, 2012, the contents of which are hereby expressly incorporated herein by reference in their entirety. However, it is understood that the mixer body 33 and the associated lobes 42, 44 can adopt any other suitable configurations to promote mixing of the bypass and core flows at the discharge end of the engine 10. For instance, exhaust mixers having various lobe numbers, lobe penetration, scalloping depth, perimeter of the trailing edge and mixing length and area ratio (A/A) are contemplated.

Figure 4:
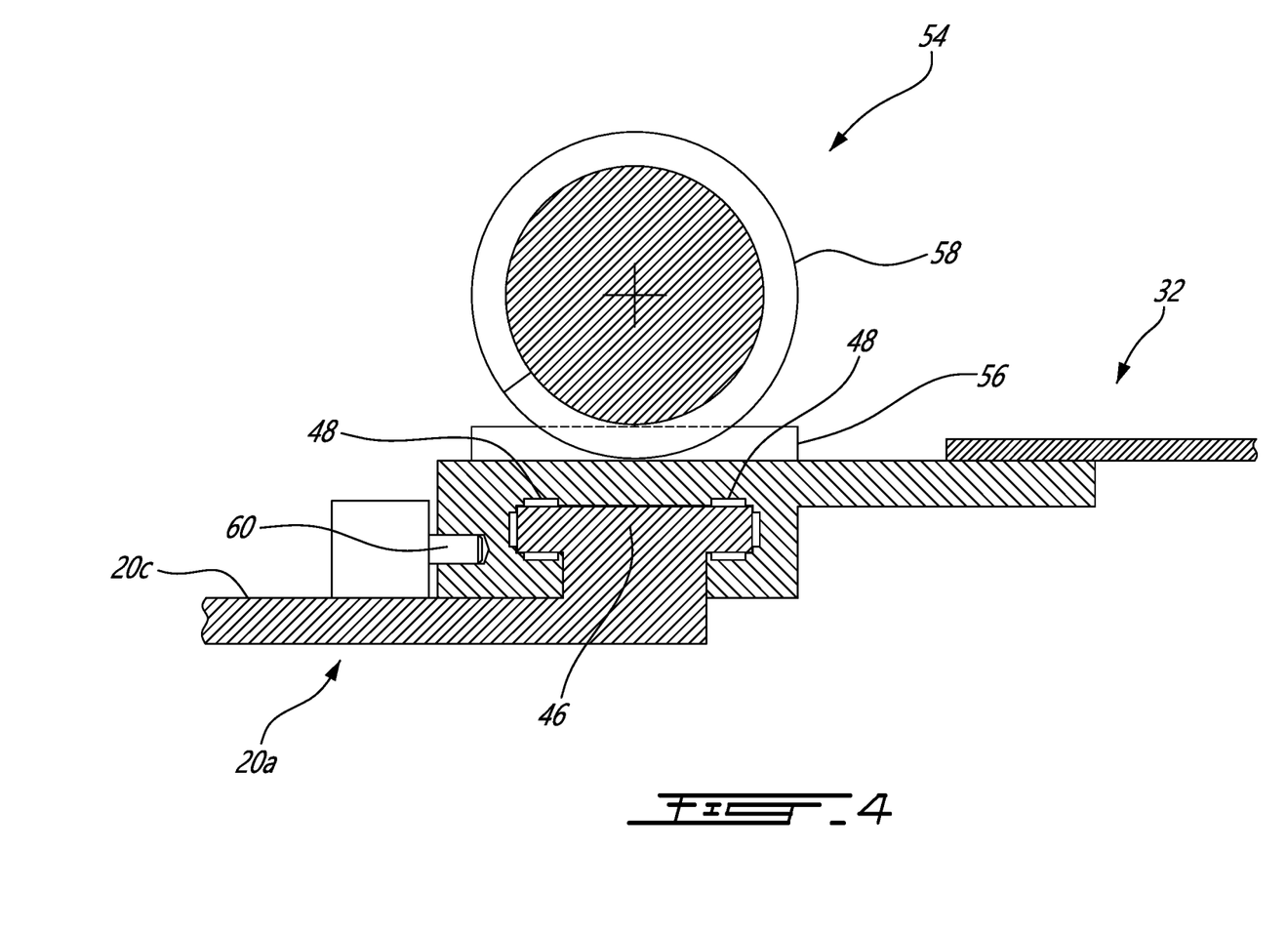
FIG. 4 is a schematic cross-section view illustrating an annular railing and bearing arrangement at a mounting interface between the mixer body and the TEC.

As will be seen herein below, the mixer body 33 is mounted for 360-degree rotation about the central axis 30. Indeed, unlike conventional exhaust mixers, which are static components, the present mixer is mounted for rotation about its central axis 30. As discussed hereinafter, it is herein contemplated to selectively drive the mixer body 33 in rotation at least during certain flight segments of the aircraft (e.g. during descent and approach to landing) to promote additional mixing of the bypass flow and the core flow and reduce noise generation. According to some embodiments and as shown in FIG. 4, the mixer body 33 is mounted at its upstream end 36 on an annular railing 46 provided on the radially outer surface of the radially outer wall 20c of the TEC 20a. According to other embodiments, where the turbine exhaust struts 20b are integrated to the exhaust mixer 32, the annular railing may be positioned between the tips of the struts 20b and the mixer body 33. As shown in FIG. 4, suitable bearings 48 are provided between the mixer body 33 and the annular railing 46 to allow the mixer body 33 to be smoothly driven in rotation about the central axis 30. It is understood that any structure allowing the mixer body 33 to fully revolve as a rotor about the central axis 30 is herein contemplated.

Referring back to FIG. 3, it can be seen that the exhaust mixer arrangement further comprises a driving unit 50 operatively connected to the mixer body 33 for selectively driving the mixer body 33 in rotation at a selected rotational speed or RPM about the central axis 30. The driving unit 50 is configured to rotate the mixer body 33 in a direction of rotation corresponding to that of the incoming swirl of combustion gases discharged from the turbine section 18 of the engine 10. The driving unit 50 may comprise an actuator 52 drivingly connected to the mixer body 33 via a transmission 54. The actuator 52 can include any suitable source of power to impart rotational movement to the mixer body 33 relative to the static structure to which the mixer body 33 is mounted. For instance, the actuator 52 may include an electric actuator, a hydraulic actuator, or a pneumatic actuator to name a few. The transmission 54 can adopt various forms, including gearing. For instance, the mixer body 33 may be fixedly connected to a first gear 56 in meshing engagement with a second gear 58 driven by the actuator 52. The first gear 56 may be bolted to the mixer body 33 or integrated as a one-piece construction with the mixer body 33. For instance, the first gear 56 may include a series of teeth projecting from an outer flange at the upstream end 36 of the mixer body 33.

According to some embodiments and as shown in FIG. 3, the first gear 56 and the second gear may be respectively provided in the form of a worm wheel and a worm. The worm wheel may be fixedly connected to the mixer body 33 and the worm may be drivingly connected to the actuator 52. The worm wheel may be bolted to the upstream end of the mixer body 33 or, alternatively, the worm wheel may be integrated formed/machined in a flange or surface of the mixer body 33.

The exhaust mixer arrangement may further comprise a lock to selectively lock the mixer against rotation. For instance, the lock could be configured to prevent rotation of the mixer body in the event of a failure condition. As shown in FIG. 4, the lock could comprise a lock pin 60 engageable with the mixer body 33.

As shown in FIG. 3, the exhaust mixer arrangement further comprises a controller 62 operatively connected to the actuator 52 of the driving unit 50. More particularly, the controller 62 is operatively connected to the actuator 52 for controlling a rotational speed of the mixer body 33. According to some embodiments, the controller 62 is configured to control the rotational speed of the mixer body 33 as a function of a flight operating condition (e.g. cruise operating regimes and transient phases like take-off, climb, decent and approach to landing). Indeed, the rotational speed of the mixer can vary depending on the flight operating condition. When the aircraft conditions, such as cruise speed and altitude, are substantially stable, such as during a cruise flight segment of the aircraft, the mixer may remain stationary. However, during transient phases, notably during approach/descent flight regimes, the controller 62 may be configured to send a control signal to the actuator 52 to drive the mixer body 33 in rotation at a selected rotational speed. The skilled person will appreciate that rotation of the mixer body 33 allows the mixer 32 to initiate mixing on its own. As a result, less aggressive lobe designs are required and, thus, pressure loss may be reduced. Furthermore, the mixer rotational speed can be adjusted to induce drag, potentially resulting in:

Reduction of the forward speed of the aircraft without needing to deploy the landing gear;

Reduction of noise levels at approach/landing;

Reduction in thermal/infrared signature of the aircraft, which is useful for military engines where thermal detection or heat-seeking weapons are used;

Improved performance (increased thrust) from increased mixing efficiency.

Pressure drag is generated through swirling outflows from the engine's propulsion system by reducing thrust. The rotation of the mixer 32 during landing, creates a swirling vortex from the jet engine exhaust flow. The constant flow of swirling air creates additional drag by reducing thrust. The rotatably driven mixer 32 may thus enable a slower, steeper and acoustically cleaner approach/descent. Another benefit is the capability to avoid thermodynamic conditions where contrails would form.

According to some embodiments, the lobes 42, 44 on the mixer 32 can be angled/twisted in the direction of rotation of the mixer body 33, where the lobes 42, 44 are circumferentially offset, alternating between inner and outer lobes. This may help further promote mixing and produce larger vorticities downstream the mixer to increase drag and reduce noise.

The controller 62 may be implemented as part of a full-authority digital engine control FADEC(s), or other similar device, including electronic engine controller(s) (EEC(s)), or a Flight Data Acquisition Storage and Transmission system, such as a FASTTM system, and the like. The controller may be implemented in part in the FASTTM system and in part in the EEC. Other embodiments may also apply. The controller may include conventional software and/or hardware, so long as the controller is configured to control the rotational speed of the mixer body 33.

In operation, the controller 62 controls the rotational speed of the mixer body 33. According to some embodiments, the controller 62 can be configured to vary the rotational speed of the mixer body 33 depending on the flight operating conditions. For instance, the controller 62 could be configured to engage rotation of the mixer body 33 only during transient phases of the flight. According to some embodiments, the controller 62 may send a control signal to the actuator 52 to engage rotation of the mixer body 33 only during a descent/approach segment of the flight. During the cruise flight segment of the aircraft, the mixer body 33 could remain stationary. The optimal range of rotational speed of the mixer body 33 may be determined via testing or by analytical/numerical models. The rotational speed of the mixer body 33 is selected to be smaller or greater than a swirl velocity of the core flow depending whether it is desired to increase the drag or the thrust.

Figure 5:
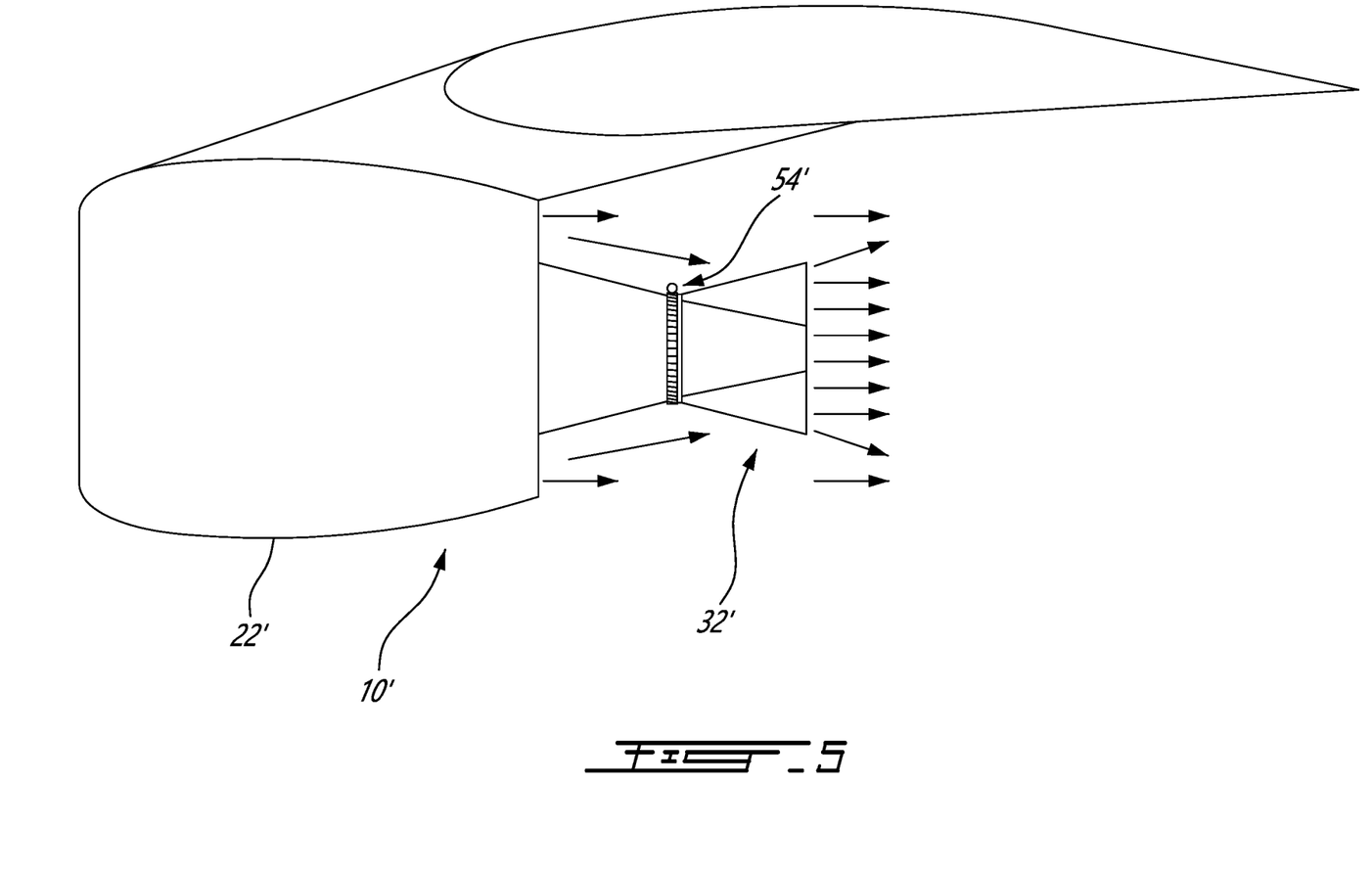
FIG. 5 is schematic view of a short cowl turbofan engine having a rotatably driven exhaust mixer.

The above-described rotatably driven mixer arrangement is not limited to long duct mixed flow engines as exemplified in FIG. 1. Indeed, as shown in FIG. 5, the rotatably driven mixer arrangement can also be applied to short cowl separate streams turbofan engines 10' on the core stream flow exhaust nozzle, wherein the exhaust mixer 32' is disposed downstream of the outer casing 22' or nacelle cowl of the engine 10'. For a short cowl arrangement, the exhaust mixer transmission 54' may be located upstream of the mixer 32', towards the tail end of the nacelle cowl.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The rotation of the mixer can be controlled via computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for governing the operation of the rotatably driven mixer. These computer program instructions may also be stored in a computer readable medium that can direct a computer, other programmable data processing apparatus, or other devices to function in a particular manner, such that the instructions stored in the computer readable medium can be used to control the rotational speed of the mixer according to predetermined parameters, such as the flight condition of the aircraft (cruise, approach, landing, etc.). The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element. The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." As used herein, the terms "coupled" or "connected" are used in their broadest sense to refer to elements which are connected, attached, and/or engaged, either directly or integrally or indirectly via other elements, and either permanently, temporarily, or removably.

As used herein, the term "drivingly" (e.g., "drivingly engaged" or "drivingly connected") describes a communicative relationship between components, for example where an output force from either a first component or a second component is directly or indirectly communicated to the other of the first component or the second component. For example, the term "drivingly connected" is intended to include any connection allowing a component to impart a movement on a second component, including, but not limited to, direct connections, direct meshed engagement, engagement through meshing with one or more intermediate meshed element(s) (worm gear, toothed wheel, etc.) and engagement through intermediate elements, e.g. idler gear.

Any suitable combination(s) of any disclosed embodiments and/or any suitable portion(s) thereof are contemplated herein as appreciated by those having ordinary skill in the art in view of this disclosure. The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

The invention claimed is:

1. An exhaust mixer arrangement for a turbofan engine having an annular bypass passage for channelling a bypass flow, and a core passage for channelling a core flow around a central axis, the exhaust mixer arrangement comprising:
   a mixer body mounted for 360-degree rotation about the central axis, the mixer body having an annular wall extending around the central axis, the annular wall defining a plurality of circumferentially distributed alternating inner lobes and outer lobes, with each of the inner lobes protruding into the core passage, and each of the outer lobes protruding into the annular bypass passage;
   a driving unit operatively connected to the mixer body for driving the mixer body in rotation about the central axis, the driving unit operable to impart full 360-degree rotations to the mixer body; and
   a controller operatively connected to the driving unit, the controller operational to control a rotational speed of the mixer body as a function of a flight operating condition.

2. The exhaust mixer arrangement according to claim 1, wherein the driving unit comprises an actuator drivingly connected to a transmission, the transmission drivingly connected to the mixer body.

3. The exhaust mixer arrangement according to claim 2, wherein the transmission includes a gear drivingly connected to the mixer body.

4. The exhaust mixer arrangement according to claim 3, wherein the gear includes a series of teeth projecting from an outer flange at an upstream end of the mixer body.

5. The exhaust mixer arrangement according to claim 3, wherein the gear is a worm wheel in meshing engagement with a worm drivingly connected to the actuator.

6. The exhaust mixer arrangement according to claim 2, wherein the controller is configured to initiate the rotation of the mixer body during a descent/approach phase of a flight.

7. The exhaust mixer arrangement according to claim 6, wherein the controller is configured to vary the rotational speed of the mixer body during the descent/approach phase of the flight.

8. The exhaust mixer arrangement according to claim 1, wherein the mixer body is rotatably supported at an upstream end thereof on an annular railing provided on a radially outer surface of a turbine exhaust case, the annular railing extending along a full circumference of the turbine exhaust case.

9. The exhaust mixer arrangement according to claim 8, wherein bearings are provided between the turbine exhaust case and the mixer body.

10. The exhaust mixer arrangement according to claim 1, wherein a lock is engageable with the mixer body to selectively lock the mixer body against rotation.

11. The exhaust mixer arrangement according to claim 1, wherein the inner lobes and the outer lobes are angled in a direction of rotation of the mixer body.

12. A turbofan engine comprising:
a fan;
an annular bypass passage for channelling air received from the fan;
a compressor downstream of the fan;
a turbine fluidly connected to the compressor via a core passage;
an exhaust mixer fluidly connected to the annular bypass passage and the core passage downstream of the turbine, the exhaust mixer having a mixer body rotatable around a central axis, the mixer body having an annular wall extending around the central axis, the annular wall defining a plurality of circumferentially distributed alternating inner lobes and outer lobes, with each of the inner lobes protruding into the core passage, and each of the outer lobes protruding into the annular bypass passage;
a driving unit operatively connected to the mixer body for driving the mixer body at a selected rotational speed around the central axis, the driving unit operable to impart full revolutions to the mixer body; and
a controller operatively connected to the driving unit, the controller configured to control the selected rotational speed of the mixer body as a function of a flight operating condition.

13. The turbofan engine according to claim 12, comprising a turbine exhaust case having a circumferential array of struts extending radially between a radially outer annular wall and a radially inner annular wall, the mixer body engaged on an annular railing provided on an outer surface of the radially outer annular wall of the turbine exhaust case, the annular railing extending along a full circumference of the radially outer wall of the turbine exhaust case.

14. The turbofan engine according to claim 13, wherein bearings are provided between the radially outer annular wall of the turbine exhaust case and the mixer body.

15. The turbofan engine according to claim 12, wherein the driving unit comprises an actuator and a gear arrangement, the gear arrangement comprising a first gear fixedly connected to the mixer body and a second gear in meshing engagement with the first gear, the second gear drivingly connected to the actuator.

16. The turbofan engine according to claim 15, wherein the first gear is a worm wheel and the second gear is a worm, the worm wheel disposed at an upstream end of the mixer body axially next to an annular railing supporting the mixer body.

17. The turbofan engine according to claim 12, wherein the controller is configured to maintain the mixer body stationary during a cruise flight segment and to initiate rotation of the mixer body during a decent/approach flight segment.

18. The turbofan engine according to claim 12, wherein the mixer body is mounted to an annular railing surrounding a circumferential array of struts, the annular railing disposed upstream of the plurality of circumferentially distributed alternating inner lobes and outer lobes.

* * * * *